United States Patent [19]

Lodoen

[11] Patent Number: 4,798,880
[45] Date of Patent: Jan. 17, 1989

[54] SPANDEX FORMED WITH A MIXTURE OF DIAMINES

[75] Inventor: Gary A. Lodoen, Fishersville, Va.

[73] Assignee: E. I. Du Pont de Nemours and Company, Wilmington, Del.

[21] Appl. No.: 139,841

[22] Filed: Dec. 30, 1987

[51] Int. Cl.⁴ .............................................. D02G 3/00
[52] U.S. Cl. .................................. 528/63; 428/364; 428/98; 528/61; 528/64; 528/78
[58] Field of Search ............... 428/364, 98; 528/61, 528/63, 64, 78

[56] References Cited

U.S. PATENT DOCUMENTS

| | | | |
|---|---|---|---|
| 2,929,803 | 3/1960 | Frazer et al. | 260/77.5 |
| 3,507,834 | 4/1970 | Wittbecker | 260/75 |
| 3,549,596 | 12/1970 | McMillan et al. | 260/75 |
| 3,926,909 | 12/1975 | Wei | 428/390 X |
| 3,979,363 | 9/1976 | Eberius et al. | 528/61 X |
| 3,994,881 | 11/1976 | Altau et al. | 260/75 |
| 4,296,174 | 10/1981 | Hanzel | 428/372 X |
| 4,340,527 | 7/1982 | Martin | 524/432 |
| 4,504,612 | 3/1985 | Ketterer | 428/364 |
| 4,548,975 | 10/1985 | Lewis | 428/364 |
| 4,725,636 | 2/1988 | Kausch et al. | 528/78 |

Primary Examiner—Lorraine T. Kendell

[57] ABSTRACT

A shaped article of a polyurethane-urea spandex formed from polyalkaneether glycol that was capped with tertiary aralkyl diisocyanate and then chain extended with a specific tricomponent diamine mixture has unexpectedly good heat settability. The diamine mixture comprises 25 to 80% of hydrogenated m-phenylenediamine, 10 to 50% of hydrogenated p-phenylendiamine and 10 to 30% of tetrachloro-p-xylylenediamine.

4 Claims, No Drawings

SPANDEX FORMED WITH A MIXTURE OF DIAMINES

BACKGROUND OF THE INVENTION

1. Field of the Invention

This invention relates to a shaped article of a polyurethane-urea spandex polymer which includes soft segments derived from a polyalkaneether glycol and hard segments derived from a certain hindered tertiary aralkyl diisocyanates. In particular, the invention concerns such an article made from spandex polymer which is formed by capping a polyalkaneether glycol with an α,α,α',α'-tetramethyl-p-xylylene diisocyanate and then extending the isocyanate-capped glycol with a specific mixture of diamines.

2. Description of the Prior Art

The art, for example Wittbecker, U.S. Pat. Nos. 3,507,834, and McMillin et al 3,549,596, discloses spandex filaments derived from a polyalkaneether glycol (e.g., polytetramethylene ether glycol, referred to herein as "PO4G") that was capped with tertiary aralkyl diisocyanate (e.g., α,α,α',α'-tetramethyl-p-xylylene diisocyanate, referred to herein as "p-TMXDI") and then chain extended with a diamine (e.g., hydrogenated m-phenylenediamine, also known as 1,3-diaminocyclohexane, referred to herein as "HmPD"). Such spandex filaments have good tensile, whitenes and degradation resistance properties, but are deficient in heat settability and in resistance to swelling by certain solvents. Wittbecker and McMillin et al disclose that a plurality of chain extenders may be employed. However, neither discloses the particular combination of the three diamine chain extenders that are required in the practice of the present invention.

An object of the present invention is to provide a polyether-based spandxx polymer of the general type disclosed by Wittbecker and McMillin et al (i.e., PO4G:pTMXDI:HmPD) that retains the good tensile characteristics of filaments made from the polymer, but also overcomes or significantly reduces its aforementioned shortcomings in heat set efficiency and solvent resistance.

Frazer et al, U.S. Pat. No. 2,929,803, discloses polyether-based spandex filaments made by reaction of a polyether glycol, a diisocyanate and a secondary amine. Poly(tetramethylene oxide) glycol is disclosed. A list of secondary diamines and a list of primary diamines with which the secondary diamines may be mixed are disclosed by Frazer et al in column 9, lines 55-74. Among the listed primary diamines are p-xylylenediamine and 1,4-diaminocyclohexane. Further, Frazer et al discloses that these diamines may be substituted with halogens, among other groups. However, tetrachloro-xylylenediisocyanates which are required in the spandex required for the present invention, are not disclosed by Frazer et al.

Although not concerned with polyether-based spandex polymers, Altau et al, U.S. Pat. No. 3,994,881, discloses polyester polyurethane-urea spandex filaments having improved resistance to degradation by ultraviolet radiation and chlorine-containing bleaches, in which the hard segments contain ureylene groups which are joined to "functionally non-aromatic" radicals, at least 25 mol percent of which are of the formula

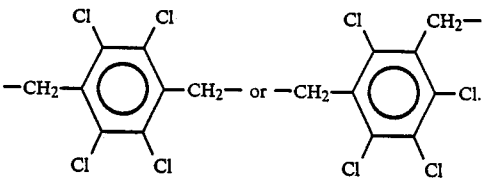

The polymers are prepared from a polyester glycol, tetra-halogenated diisocyanates and tetra-halogenated diamines. These tetra-halogenated diamines have been found by the present inventor to be useful as a minor constituent of the three-component diamine mixture employed as chain-extenders for the spandex of the shaped article of the present invention.

SUMMARY OF THE INVENTION

The present invention provides an improved shaped article of spandex polymer derived from a polyalkaneether glycol that was capped with a tertiary aralkyl diisocyanate and then chain extended with diamine wherein the improvement comprises the chain-extending diamine being a mixture consisting essentially of 25 to 80% hydrogenated m-phenylene diamine, 10 to 50% of hydrogenated p-phenylene diamine and 10 to 30% of tetrachloro-p-xylylenediisocyanate, all percentages of the amines being mole percents. The chain-extending diamine mixture preferably consists essentially of 35 to 55% of HmPD, 30 to 45% of HpPD and 10 to 25% of TClpXD. Preferably, the spandex is in the form of a shaped article, most preferably, a fiber or film.

DETAILED DESCRIPTION OF PREFERRED EMBODIENTS

As used herein, the term "spandex" has its usual definition; that is, a long chain synthetic polymer that comprises at least 85% by weight segmented polyurethane. The terms "soft segment" and "hard segment" refer to specific portions of the spandex polymer chains. The soft segments are the polyether-based portions of the segmented polyurethane-urea polymer, preferably made from a poly(tetramethyleneether)glycol. The hard segments refer to the portions of the polymer chains that are derived from tertiary aralkyl diisocyanate, preferably α,α,α',α'-tetramethyl-p-xylylene diisocyanate, and the three-component chain-extending diamine mixture of the invention. "NCO content" refers to the isocyanate end group content of a polymer, before chain extension.

For convenience, in the discussion and examples which are presented hereinafter, the following abbreviations may be used for the accompanying listed chemical:

| | |
|---|---|
| poly(tetramethyleneether)glycol | PO4G |
| α,α,α',α'-tetramethyl-p-xylylene diisocyanate | p-TMXDI |
| hydrogenated m-phenylenediamine | HmPD |
| hydrogenated p-phenylenediamine | HpPD |
| tetrachloro-p-xylylenediamine | TClpXD |
| p,p'-methylene diphenyl diisocyanate | MDI |
| methylene-bis(4-phenylisocyanate) | MDI |
| ethylenediamine | EDA |
| N,N—dimethylacetamide | DMAc |
| 1,1-bis(2-methyl-4-hydroxy-5-t-butylphenyl)butane | SWP |

Chemical composition of the spandex polymers illustrated in the examples also may be abbreviated. The monomers of the repeating units of the polymer are separated by colons (i.e., soft segment, diisocyanate and diamine are separated by colons). Thus, a commercial spandex polymer made from polytetramethyleneether glycol (i.e., PO4G), p,p'-methylene diphenyl diisocyanate (i.e., MDI) and a mixture of ethylene diamine (i.e., EDA) and hydrogenated m-phenylenediamine (i.e., HmPD) is abbreviated as PO4G:MDI:EDA/HmPD. Also, a polymer made in accordance with the present invention is abbreviated as PO4G:p-TMXDI:HmPD/HpPD/TClpXD(40/40/20). The diamines separated by slashes (i.e., / ) are in a mixture and the numbers parenthetically following such mixtures represent the respective molar percentages of each of the three diamine constituents of the mixture.

In accordance with the present invention, the preferred polytetrametyleneether glycol which is used to form the hard segment of the spandex polymer usually has has a number average molecular weight in the range of 600 to 5,000 and a melting point of lower than 60° C. Preferably, the glycol has a molecular weight in the range of 1,500 to 2,500 and most preferably, in the range of 1,700 to 2,200.

To prepare the spandex polymer for the shaped article of the invention, the above-described glycol is reacted (or "capped", as it is often referred to) in a conventional manner with an excess of a tertiary aralkyl diisocyanate, preferably α,α,α',α'-tetramethyl-p-xylylene diisocyanate (p-TMXDI) to form an isocyanate-terminated polymer. Preferably the NCO content of the isocyanateterminated polymer is in the range of 2.3 to 3%, most preferably in the range of 2.4 to 2.7%.

The capped polymer is then chain-extended with a three-component diamine mixture of HmPD, HpPD and TClpXD to form the spandex polymer which is used to produce the shaped articles of the invention. The molar concentration of each of these ingredients in the diamine mixture is 25–80%, preferably 35–55%, of HmPD; 10–50%, preferably 30–45%, of HpPD; and 10–30%, preferably 10–25%, of TClpXD.

The present inventor made several important findings concerning the three-component diamine mixture required for spandex articles of the present invention. When Hmpd was used alone as the only chain-extension diamine for polymer formed from PO4G and p-TMXDI, as disclosed in Wittbecker, U.S. Pat. No. 3,507,834, the resultant spandex polymer could be made into films or filaments that had good tensile and elastic properties. However, such articles had inadequate heat set efficiency and poor resistance to certain solvents (e.g. mineral oil, oleic acid, t-butanol). When HpPd and HmPD were used in a two component mixture of diamine chain extenders to form similar spandex polymer, the heat set efficiency was much improved but power was diminished and the articles still were lacking in resistance to solvents. When HmPD and TClpXD were used as a two-component diamine chain-extension mixture to make similar polymer, the resultant articles usually had adequate solvent resistance, but still lacked in power. Surprisingly, the present inventor found that when the three-component diamine mixture of HmPD/HpPD/TClpXD was used to form spandex articles in accordance with the present invention, the thusly formed articles overcame the previously noted shortcomings and possessed good power, excellent heat set efficiency and satisfactory solvent resistance. Some of these effects and findings are illustrated in the Examples and comparisons set forth hereinafter.

Reactions used for preparing spandex polymer suitable for the articles of the present invention usually are carried out in an inert solvent, such as dimethylacetamide, dimethylformamide or the like. Preferred forms of the shaped spandex article of the invention are fibers and films. These articles can be made by conventional wet spinning, extrusion or casting techniques. For example, the polymer can be dry spun into filaments from the same solvent as was used for the polymerization. The filaments can then be heat set, usually by holding the filaments for 2 to 10 minutes at 145° to 165° C. while extended to 1.5 to 3.5 times their original length and then immersing them in boiling water in a relaxed condition for at least 20 minutes. Higher setting temperatures for shorter times (e.g., at 195° C. for 30 seconds) sometimes can be employed satisfactorily.

As noted above, the spandex polymer for use in the present invention is made with a three-component diamine mixture that is used for chain extension of a polyalkaneether glycol that was capped with a tertiary aralkyl diisocyanate. However, it should be noted that a small amount (e.g., as much as perhaps 15%) of other polyalkaneether glycols than the preferred PO4G can be copolymerized, so long as the glycols do not detrimentally affect the tensile, elastic and solvent-resistant properties of the resultant spandex polymer. Similarly, small amounts of other diisocyanates may be used to form the polymer, as long as equivalent results are obtained.

The spandex polymer of shaped articles of the invention can contain conventional agents that are added for specific purposes, such as antioxidants, thermal stabilizers, UV stabilizers, pigments, dyes, titanium dioxide, lubricating agents and the like.

The spandex articles of the invention have unexpectedly good heat settability accompanied by satisfactory elastic and tensile properties and are therefore well suited for use in fabrics or laminates that include elastic elements.

The following test procedures were used in the Examples and Comparisons below for measuring various parameters and properties of the prepared spandex fibers or films.

The molecular weights reported herein are number average molecular weights of the polyether diols. Each was determined from the hydroxyl number of the polyether diol, which was measured by the imidazole-pyridine catalyst method described by S. L. Wellon et al, "Determination of Hydroxyl Content of Polyurethane Polyols and Other Alcohols", *Analytical Chemistry*, Vol. 52, No. 8, pp. 1374–1376 (July 1980).

The NCO content of isocyanate-capped polycarbonate was measured by the method of S. Siggia, "Quantitative Organic Analysis via Functional Group", 3rd Edition, Wiley & Sons, New York, pages 559–561 (1963).

Strength and elastic properties of the spandex filaments were measured in accordance with the general method of ASTM D 2731-72. Three filaments, a 2-inch (5-cm) gauge length and a zero-to-300% elongation cycle were used for each of the measurements. The samples were cycled five times at an constant elongation rate of 800% per minute and then held at the 300% extension for half a minute after the fifth extension. "Power" is the stress at an extension of 100% for the fifth load or unload cycle and is reported in milligrams per denier. Percent elongation at break was measured on the sixth extension cycle.

Heat set efficiency was measured on samples that were stretched and held at one-and-a-half times their original length, heated at 195° C. for 60 seconds, relaxed and then immersed in boiling water for 30 minutes. The heat set efficiency ("% HSE") was then calculated as $$\% \, HSE = 100[1 - \{(L_f - L_o)/L_o\}],$$

where $L_o$ and $L_f$ are respectively the filament length, when held straight without tension, before and after the heat setting treatment.

In the Examples which follow, all samples of the invention were made with the same polyalkaneether glycol (i.e., PO4G) and the same tertiary aralkyl diisocyanate, (i.e., p-TMXDI). Samples of the invention are identified with arabic numbers. Several samples, which are outside the invention, were made for comparison purposes, and are identified with capital letters.

EXAMPLE I

This example illustrates the advantages in physical properties, particularly heat set efficiency, of spandex films made with the three-component mixture of diamine chain extenders in accordance with the invention in comparison to such spandex films made with certain one-component and two-component diamine chain extenders.

Except for comparison Sample D, the spandex polymer for each of the samples of this example was prepared by substantially the same procedure. Sample D was a commercial PO4G:MDI:EDA/HmPD(80/20) polyether-based spandex polymer, made substantially as described in Example 1 of U.S. Pat. No. 3,428,711. The properties of comparison Sample D indicate what is considered acceptable in commerce.

Each of the samples, except D, was prepared in a reaction vessel of one-liter capacity that was employed with a stirrer, a thermometer and gas inlet and outlet lines. Argon was passed through the system to maintain an inert gas blanket over reaction mixtures in the vessel. The particular samples were prepared as described below. Some of the properties of films made from the spandex polymers are summarized in Table I.

Samples 1–5 of the invention were prepared from a spandex polymer of PO4G:p-TMXDI:HmPD/HpPD/TClpXD. The molar percentages of the diamines are listed in Table I. The preparation of Sample 1 was typical. For Sample 1, 81 grams of 1800 molecular weight PO4G was loaded into the dry reaction vessel. To assure removal of all moisture, 10 ml of toluene were added and the contents of the vessel were heated at 115° C. for 30 minutes. After cooling to 60° C., the PO4G was capped by adding 19.5 grams of p-TMXDI and 30 ppm of dibutyltin dilaurate catalyst to the reaction vessel and heating at 75° C. for 150 minutes. The resultant capped polymer had an NCO content of 2.51%. The vessel and its contents were then cooled to below 40° C. and 200 grams of DMAc were added. Chain extension was accomplished by adding a mixture of HmPD, HpPD and TClpXD in the molar ratios listed in Table I. The chain extension reaction was followed externally to an end point with an external bromophenol blue indicator. The resultant polymer had an intrinsic viscosity of greater than 1.0. SWP antioxidant was then added to the polymer solution in an amount equivlent to 1% of SWP based on the weight of the polymer. The polymer solution was then cast into film as described below.

Sample A was prepared from PO4G:p-TMXDI:HmPD polymer, of the type disclosed in Wittbecker, U.S. Pat. No. 3,507,834. The polymer synthesis for this comparison sample, was started by loading 81.3 grams of PO4G of 1829 number average molecular weight into the dry reaction vessel, adding 10 ml of toluene and heating the contents of the vessel at 115° C. for 30 minutes to assure removal of all moisture. After cooling to about 60° C., 18.7 grams of p-TMXDI and 15 ppm of dibutyltin dilaurate catalyst were added for capping the polyether glycol with diisocyanate. The capping reaction was carried out at a temperature of 85° C. for 75 minutes. The contents were then cooled to 40° C. to provide an isocyanate-capped glycol polymer having a 2.62% NCO content. Then 201 grams of DMAc, followed by 78.6 grams of 1 Normal HmPD in DMAc, were added to the vessel to accomplish the chain extension reaction. A molecular weight regulator (or "chain terminator"), t-butylethanol amine ("t-BEA"), was also added to the reaction mixture at this stage, which amounted to 25 milliequivalents of t-BEA per kilogram of polymer formed. The chain-extension reaction was followed to its end point with a bromophenol blue external indicator. The resultant spandex polymer had an intrinsic viscosity of 1.05. Based on the weight of the polymer, 1% of Santowhite SWP antioxidant was added to the polymer solution.

Samples B was prepared from a spandex polymer of PO4G:p-TMXDI:HmPD/HpPD wherein the diamines were in a 50/50 ratio. Substantially the same procedure as was used to prepare the spandex of Sample A was used for the spandex polymer of this sample. The vessel was loaded with 81.02 grams of PO4G of 1800 molecular weight. Then, 10 ml of toluene were added and the contents were heated, under a flow of argon, at 115° C. for 30 minutes to assure removal of all moisture. After the contents of the vessel were cooled to about 50° C., 18.98 grams of p-tMXDI and 30 ppm of dibutyltin dilaurate catalyst were added. The contents were then heated at 75° C. for 120 minutes. The resultant isocyanate-capped polymer had an NCO content of 2.57%. The vessel was then cooled to 40° C. and 200 grams of DMAc were added, to form a solution. Chain extension was then accomplished by adding 3.70 grams of a 50/50 mixture of HmPD and HpPD. The chain extension reaction was monitored to completion with bromophenol blue external indicator. The resultant polymer had an intrinsic visocosity of 1.19. Santowhite SWP antioxidant was added to the polymer solution to provide 1% of SWP based on the weight of the spandex polymer. The solution was diluted further with an additional 75 grams of DMAc.

To prepare comparison Sample C, the same procedure as was used for preparing the isocyanate-capped polymer of Sample B was repeated. Chain extension was carried out with a diamine 90/10 mixture of HmPD and TClpXD. The resultant polymer had an intrinsic viscosity of greater than 1.0. SWP amounting to 1% by weight of the polymer was added.

The above-described solutions of spandex polymer for Samples 1–5 of the invention and comparison Samples A–D were converted into films by casting the prepared solutions on polyester film and then applying a doctor knife that provided a 0.020-inch-thick gap. The thusly formed film composites were allowed to dry in air for about 16 hours and then cut into ½-inch wide strips. The spandex film was then separated from the polyester film base.

The properties of the various film samples produced by the procedures of this example are summarized in Table I. Note the relatively poor heat set efficiency of comparison Sample A. Note the relatively low unload power ($UP_{100}$) of comparison Samples B and C. In contrast, Samples 1-5 of the invention exhibited relatively high heat set efficiencies and satisfactory power and elongation characteristics. The film samples of the invention (Samples 1-5) also compare favorably with the film of Sample D, which was made from a commercial spandex polymer.

TABLE I (Example I, Film data)

| Sample | Chain Extenders Diamines | Molar % | Properties[1] HSE | $UP_{100}$ | $LP_{100}$ | $E_b$ |
|---|---|---|---|---|---|---|
| HmPD/HpPD/TClpXD Samples |
| 1 | See Note 2 | 80/10/10 | 94 | 11 | 25 | 597 |
| 2 | See Note 2 | 40/40/20 | 100 | 10 | 21 | 578 |
| 3 | See Note 2 | 40/35/25 | 90 | 9 | 23 | 624 |
| 4 | See Note 2 | 35/45/20 | 92 | 10 | 24 | 578 |
| 5 | See Note 2 | 30/50/20 | 95 | 10 | 21 | 615 |
| Comparisons |
| A | HmPD | 100 | 69 | 10 | 34 | 616 |
| B | HmPD/HpPD | 50/50 | 90 | 8 | 27 | 490 |
| C | HmPD/TClpXD | 90/10 | 88 | 7 | 31 | 821 |
| D | Commercial[3] | See Note 3 | 88 | 12 | 28 | 620 |

Notes:
[1]HSE is % heat set efficiency and $UP_{100}$, $LP_{100}$ and $E_b$ are respectively unload power and load power in milligrams/denier and break elongation in percent.
[2]Samples 1-5 are prepared with HmPD/HpPD/TClpXD diamine mixtures of the listed molar ratios.
[3]A commercial spandex sample made from PO4G:MDI:EDA/HmPD(80/20).

EXAMPLE II

The general procedure of Example I, Samples 1-5, was repeated to prepare solutions of spandex polymer in which the ratios of HmPD/HpPD/TClpXD in the diamine chain extenders were as listed in Table II. The solutions were dry spun by conventional procedures into five-filament, 40-denier, coalesced yarns. Properties of the thusly produced yarns are listed in Table II. A yarn prepared from the commercial spandex solution of comparison Sample D of Example I is included in Table II. As shown by film Samples 1-5 of Example I, fiber Samples 6-9 of the invention of this example, also exhibit good heat set efficiency, load and unload power and elongation.

TABLE II (Example II, Fiber data)

| Sample | Chain Extenders Diamines | Molar % | Properties[1] HSE | $UP_{100}$ | $LP_{100}$ | $E_b$ |
|---|---|---|---|---|---|---|
| HmPD/HpPD/TClpXD Samples |
| 6 | Note 2 | 50/35/15 | 83 | 14 | 27 | 431 |
| 7 | Note 2 | 50/25/25 | 83 | 12 | 32 | 509 |
| 8 | Note 2 | 42.5/42.5/15 | 91 | 13 | 26 | 524 |
| 9 | Note 2 | 37.5/37.5/15 | 91 | 11 | 25 | 600 |
| Comparison |
| D | Note 3 | Note 3 | 91 | 13 | 26 | 502 |

Notes:
See notes to Table I.

I claim:

1. An improved shaped article of a spandex polymer formed from polyalkaneether glycol that was capped with tertiary aralkyl diisocyanate and then chain extended with diamine, wherein, for increased heat-settability, the improvement comprises
   the chain-extending diamine being a mixture that consists essentially of
   25 to 80% of hydrogenated m-phenylenediamine,
   10 to 50% of hydrogenated p-phenylenediamine and
   10 to 30% of tetrachloro-p-xylylenediamine, all percentages being molar percent.

2. A shaped article in accordance with claim 1 wherein the polyalkaneether glycol is polytetramethyleneether glycol, the tertiary aralkyl disocyanate is α,α,α',α'-tetramethyl-p-xylylenediisocyanate and the diamine mixture consists essentially of
   35 to 55% of hydrogenated m-phenylenediamine,
   30 to 45% of hydrogenated p-phenylenediamine and
   10 to 25% of tetrachloro-p-xylylenediamine.

3. A shaped article in accordance with claim 1 or 2 in the form of a fiber.

4. A shaped article in accordance with claim 1 or 2 in the form of a film.

* * * * *